United States Patent
Zhang

(10) Patent No.: US 10,652,209 B2
(45) Date of Patent: May 12, 2020

(54) ROUTER ADDRESS TYPE IDENTIFICATION METHOD AND APPARATUS

(71) Applicant: Alibaba Group Holding Limited, George Town (KY)

(72) Inventor: Wen Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/944,630

(22) Filed: Apr. 3, 2018

(65) Prior Publication Data

US 2018/0227270 A1 Aug. 9, 2018

Related U.S. Application Data

(63) Continuation of application No. PCT/CN2016/101640, filed on Oct. 10, 2016.

(30) Foreign Application Priority Data

Oct. 14, 2015 (CN) .......................... 2015 1 0662220

(51) Int. Cl.
*H04L 29/12* (2006.01)
*G06Q 30/02* (2012.01)

(52) U.S. Cl.
CPC ..... *H04L 61/6022* (2013.01); *G06Q 30/0201* (2013.01); *G06Q 30/0261* (2013.01); *H04L 29/12* (2013.01)

(58) Field of Classification Search
CPC . H04L 61/6022; H04L 29/12; G06Q 30/0201; G06Q 30/0261
See application file for complete search history.

(56) References Cited

U.S. PATENT DOCUMENTS 8,989,101 B1 3/2015 Mishra
2011/0271311 A1 11/2011 Berger et al.
(Continued)

FOREIGN PATENT DOCUMENTS

CN 101083556 12/2007
CN 103354550 10/2013
(Continued)

OTHER PUBLICATIONS

International Search Report issued by the International Searching Authority in International Application No. PCT/CN2016/101640 dated Dec. 30, 2016; 8 pages.
(Continued)

*Primary Examiner* — Lakeram Jangbahadur
(74) *Attorney, Agent, or Firm* — Fish & Richardson P.C.

(57) ABSTRACT

A router media access control (MAC) address for a router, and network interaction data are received. The network interaction data indicates a connection between a user device and the router through an association between a user MAC address of the user device and the router MAC address. An access parameter number is determined based on one or more connections of one or more user devices to the router over a predetermined period of time. The one or more connections can be determined based on the network interaction data. The router address type is identified based on a comparison between the access parameter number and a predetermined threshold.

14 Claims, 10 Drawing Sheets

(56) References Cited

U.S. PATENT DOCUMENTS

| | | | | |
|---|---|---|---|---|
| 2012/0213211 A1* | 8/2012 | Remaker | ............ | H04L 63/0421 |
| | | | | 370/338 |
| 2015/0327007 A1* | 11/2015 | Li | .......................... | H04W 4/02 |
| | | | | 455/456.1 |
| 2016/0269359 A1* | 9/2016 | Adrangi | .............. | H04L 61/6022 |
| 2018/0279368 A1* | 9/2018 | Butt | ...................... | H04W 72/08 |

FOREIGN PATENT DOCUMENTS

| | | |
|---|---|---|
| CN | 103475748 | 12/2013 |
| CN | 104462059 | 3/2015 |
| CN | 104683484 | 6/2015 |
| CN | 104883735 | 9/2015 |
| CN | 105721341 | 6/2016 |
| JP | 2005-079691 | 3/2005 |
| KR | 2008-0091410 | 10/2008 |
| KR | 2013-0099532 | 9/2013 |

OTHER PUBLICATIONS

Search Report and Written Opinion of the Intellectual Property Office of Singapore issued in Singapore Application No. 11201803114P dated Jul. 9, 2018; 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

ROUTER ADDRESS TYPE IDENTIFICATION METHOD AND APPARATUS

This application is a continuation of PCT Application No. PCT/CN2016/101640, filed on Oct. 10, 2016, which claims priority to Chinese Patent Application No. 201510662220.5, filed on Oct. 14, 2015, and each application is hereby incorporated by reference in its entirety.

TECHNICAL FIELD

The present disclosure relates to the field of Media Access Control (MAC) address identification, and more particularly, to router address type identification method and apparatus.

BACKGROUND

In an Internet environment, and particularly a mobile Internet environment, business and residential addresses need to be obtained in many scenarios, such as an online-to-offline (O2O) service scenario. Currently, many systems mainly obtain business and residential addresses by using information filled-in by users during user registration or mining addresses from logistics data.

In related technologies, an address type is usually determined by using an address entered by a user during user registration. However, the introduction of a human factor can result in the risk related to the authenticity of the entered address. Consequently, problems of deficient data, relatively low coverage, and difficulties in distinguishing between address types can happen. In an example of the business address and the residential address, few offline users or stores write address information during registration, and actually, shipping addresses used when many businesses deliver goods are not necessarily real business addresses, for example, may be merchant warehouse addresses. Therefore, problems of deficient data, low data coverage, a relatively high difficulty in distinguishing a business from a residential, etc. are caused when the business address and the residential address are obtained by using the method such as information filled-in by users during user registration or mining addresses from logistics data in the related technology.

SUMMARY

Embodiments of the present disclosure provide router address type identification method and apparatus, so as to resolve problems in related technologies such as deficient data, low data coverage, relatively high difficulty in distinguishing a business from a residence in a router MAC address type identification scheme.

According to an aspect of the embodiments of the present disclosure, a router address type identification method is provided, including: obtaining network interaction data collected by a server, where the network interaction data includes user Media Access Control (MAC) address data and router MAC address data; determining a relationship between a router MAC address and a user MAC address based on the user MAC address data and the router MAC address data; counting, based on the relationship between the router MAC address and the user MAC address, an access parameter obtained after each user MAC address in the user MAC address data accesses a router that is to be identified corresponding to the router MAC address within a predetermined period; and identifying a router MAC address type of the router based on a comparison between a counting result and a predetermined threshold.

According to another aspect of the embodiments of the present disclosure, a router address type identification apparatus is further provided, including: a first acquisition module, configured to acquire network interaction data collected by a server, where the network interaction data includes user Media Access Control (MAC) address data and router MAC address data; a determining module, configured to determine a relationship between a router MAC address and a user MAC address based on the user MAC address data and the router MAC address data; a counting module, configured to count, based on the relationship between the router MAC address and the user MAC address, an access parameter obtained after each user MAC address in the user MAC address data accesses a router corresponding to the router MAC address within a predetermined period; and an identification module, configured to identify a router MAC address type of the router based on a comparison between a counting result and a predetermined threshold.

In the embodiments of the present disclosure, the result of the comparison between the predetermined threshold and the counting result is obtained by counting the access parameter obtained after each user MAC address in the user MAC address data accesses the router corresponding to the router MAC address within the predetermined period, so as to determine the router MAC address type. This achieves objectives of improving coverage and efficiently distinguishing between router address types, thereby resolving technical problems such as deficient data, low data coverage, a relatively high difficulty in distinguishing a business from a residence in a MAC address type identification scheme in a related technology.

BRIEF DESCRIPTION OF DRAWINGS

The accompanying drawings described here are intended to provide a further understanding of the present disclosure, and constitute a part of the present application. The illustrative embodiments of the present disclosure and descriptions of the embodiments of the present disclosure are intended to describe examples of the present disclosure, and do not constitute limitations on the present disclosure. In the accompanying drawings.

DESCRIPTION OF EMBODIMENTS

Figure 1:
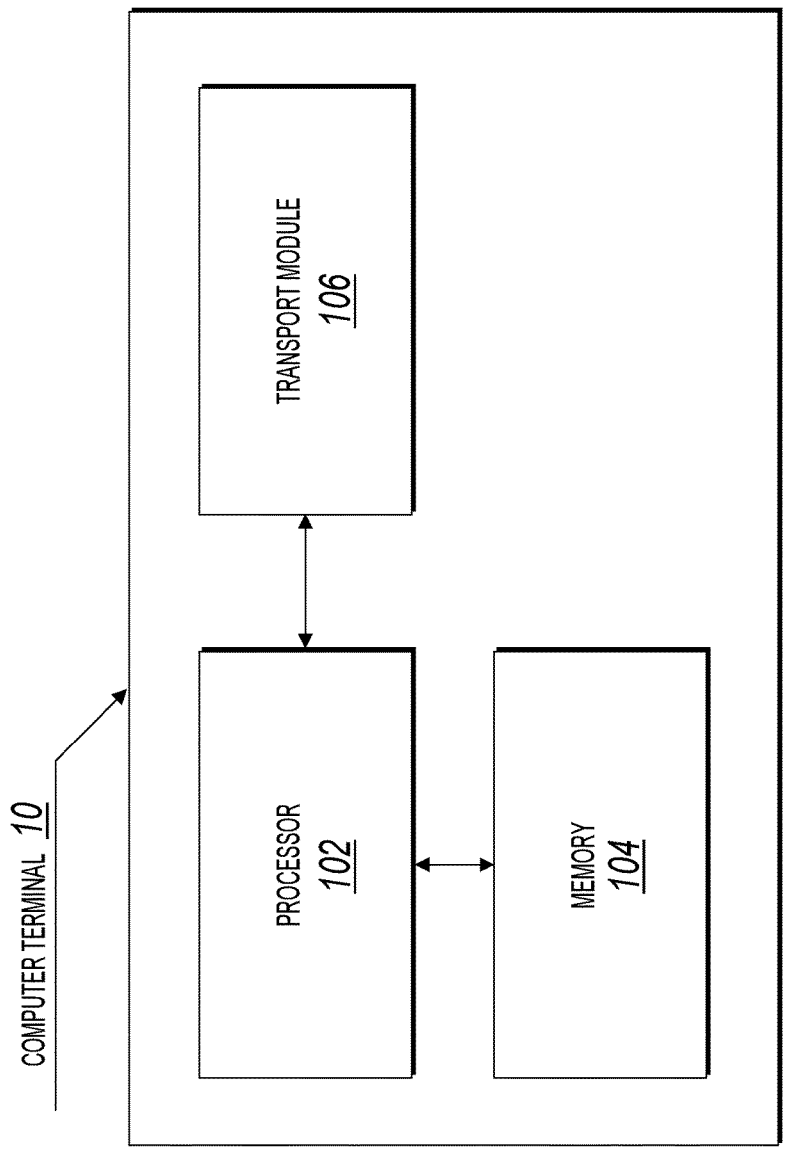
FIG. 1 is a structural block diagram of hardware of a computing device in a router address type identification method, according to an embodiment of the present disclosure.

To help a person skilled in the art better understand the solutions in the present disclosure, the following description describes the technical solutions in the embodiments of the present disclosure with reference to the accompanying drawings. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

It should be noted that the terms such as "first", "second" in the specification, claims, and accompanying drawings of the present disclosure are intended to distinguish between similar objects but do not necessarily indicate a specific order or sequence. It should be understood that the data used in such a way is interchangeable in proper situations, so that the embodiments of the present disclosure described here can be implemented in other orders than the order illustrated or described here. Moreover, the terms "include", "contain" and any other variants are intended to cover the non-exclusive inclusion. For example, a process, method, system, product, or device that includes a series of steps or units is not necessarily limited to those steps or units that are listed, but can include other steps or units that are not listed or are inherent to such a process, method, system, product, or device.

To facilitate understanding of the embodiments of the present disclosure, technical terms used in the embodiments of the present disclosure are described as follows:

MAC address: an identifier used to represent each site on a network (for example, the Internet), is represented by a hexadecimal digit, and includes six bytes (48 bits) in total. The first three bytes are code (24 high-order bits) allocated by an IEEE registration authority (RA) to different manufacturers and also referred to as an "organizationally unique identifier". The last three bytes (24 low-order bits) are assigned by each manufacturer to a produced adapter interface and referred to as an extended identifier (unique).

Router: it is a device connected to each local area network or wide area network on the Internet. The router automatically selects and sets a route based on channel status, and sends signals in a sequence by using an optimal path.

O2O: O2O is online-to-offline (or referred to as online/offline) and refers to combining an offline business opportunity with the Internet, so that the Internet can become an offline transaction foreground.

Embodiment 1

This embodiment of the present disclosure further provides a router address type identification method. It should be noted that steps shown in flowcharts of the accompanying drawings can be, for example, performed by a computing system such as a set of computer executable instructions. In addition, although a logical sequence is shown in the flowchart, in some cases, the shown or described steps can be performed in a different order.

The method provided in Embodiment 1 of the present application can be performed by a mobile terminal, a computer terminal, or a similar computing apparatus. As an example that the method is performed by the computer terminal, FIG. 1 is a hardware block diagram illustrating a computer terminal that can perform an example of a router address type identification method, according to an embodiment of the present disclosure. As shown in FIG. 1, a computer terminal 10 can include one or more (only one is shown in the figure) processors 102 (the processor 102 can include but is not limited to a processing apparatus such as a microprocessor (MCU) or a field programmable gate array (FPGA)), a memory 104 configured to store data, and a transport module 106 for communication. A person of ordinary skill in the art can understand that the structure shown in FIG. 1 is merely an example, and does not limit the structure of the computer terminal. For example, the computer terminal 10 can further include more or fewer components than those shown in FIG. 1, or can have a configuration different from that in FIG. 1.

The memory 104 can be configured to store a software program and a module of application software, for example, a program instruction or module corresponding to the router address type identification method in this embodiment of the present disclosure. The processor 102 runs the software program and the module stored in the memory 104 execute various functions and data processing, and performs risk identifications. The memory 104 can include a high-speed random access memory, or can include a non-volatile memory such as one or more magnetic storage apparatuses, a flash memory, or another non-volatile solid-state memory. In some cases, the memory 104 can further include a memory remotely disposed from the processor 102. The remote memory can connect to the computer terminal 10 by using a network. The network includes but is not limited to the Internet, an intranet, a local area network, a mobile communication network, or a combination thereof.

The transport module 106 is configured to receive or send data by using a network. The network can specifically include a wireless network provided by a communication provider of the computer terminal 10. In an example, the transport module 106 includes a network interface controller (NIC), and the NIC can connect to other network devices by using a base station, so as to communicate with the Internet. In an example, the transport module 106 can be a radio frequency (RF) module, and the RF module is configured to wirelessly communicate with the Internet.

Figure 2:
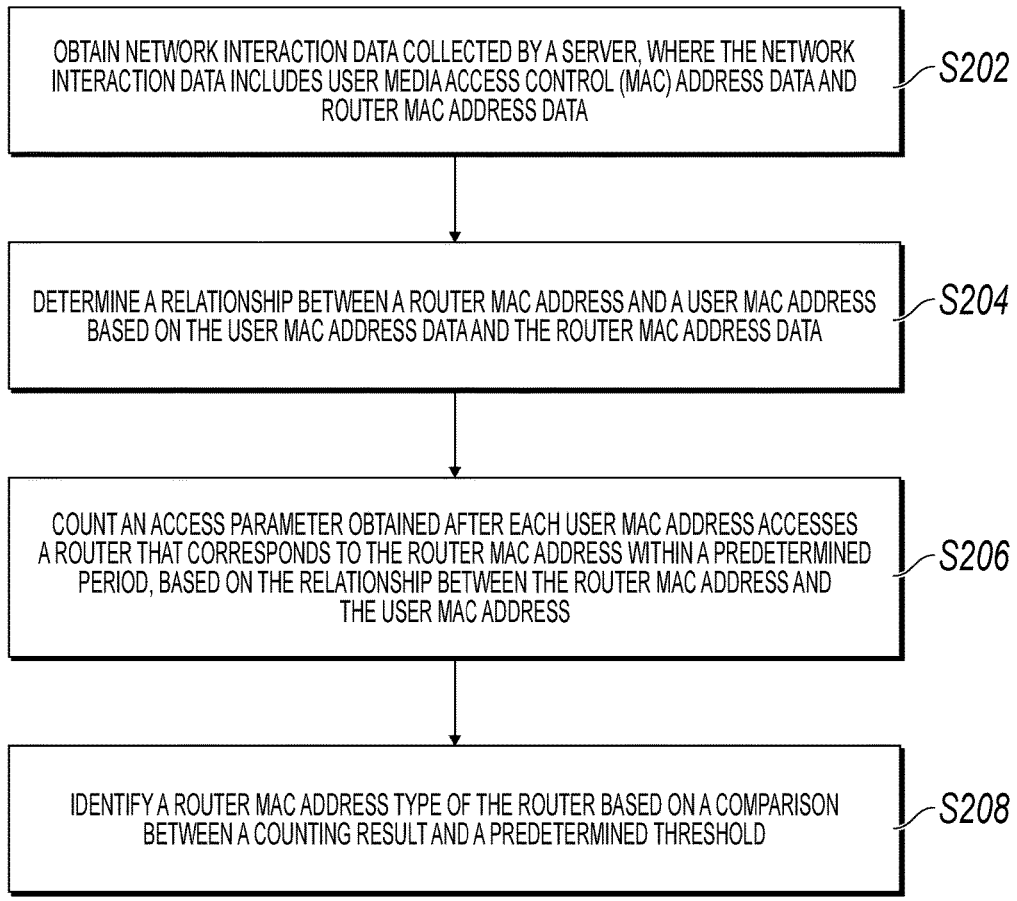
FIG. 2 is a schematic flowchart of an optional router address type identification method, according to an embodiment of the present disclosure.

In the operating environment, the present application provides a router address type identification method, such as the method shown in FIG. 2. FIG. 2 is a flowchart illustrating an optional router address type identification method, according to an embodiment of the present disclosure. As shown in FIG. 2, the method includes the following processing steps.

Step S202: Obtain network interaction data collected by a server, where the network interaction data includes user Media Access Control (MAC) address data and router MAC address data.

In some implementations, the network interaction data can further include user location information and router location information. As such, router MAC address type and location information of a router that is to be identified are stored in a database, so that different applications can be performed based on the two pieces of location information in a specific implementation. For example, the location information of the router can be determined based on, but is not limited to, location information of a user accessing the router etc. It should be noted that the user location information and the router location information can be represented as, but is not limited to, geographical location information such as longitude and latitude information.

In some implementations, this step can be implemented in a plurality of ways. For example, the network interaction data can be obtained from a third-party device, obtained locally, or by calculating historical data based on a database technology to extract-transform-load (ETL).

Step S204: Determine a relationship between a router MAC address and a user MAC address based on the user MAC address data and the router MAC address data.

Optionally, the relationship between the router MAC address and the user MAC address can be described as an "accessed" and "accessing" relationship.

Step S206: Count an access parameter obtained after each user MAC address accesses a router that corresponds to the router MAC address within a predetermined period, based on the relationship between the router MAC address and the user MAC address.

Optionally, the access parameter can be used to reflect information about a number of users accessing the router and an access frequency. For example, in an optional embodiment, the access parameter includes one or any combination of the following listed information: the number of users accessing the router within a first predetermined period, the total number of times of all users accessing the router within a second predetermined period, and the number of successful accesses of a specific user accessing the router within a third predetermined period.

Optionally, the predetermined period here can be set based on an actual situation, for example, can be set to one day, one month, or one quarter. For example, the number of users that have successfully accessed the router per day during one month can be determined, to obtain an average number of successfully accessed user accesses of the router per day.

Step S208: Identify a router MAC address type of the router based on a comparison between a counting result and a predetermined threshold.

The predetermined threshold can be determined based on an actual implementation. For example, different thresholds can be predetermined based on different information in step S206. For example, in an optional implementation, if the number of users in step S206 is an average number of successfully accessed users of the router per day, a predetermined threshold corresponding to the number of users can be set based on the average number of successfully accessed users per day that is allowed by the router.

In an optional embodiment of the present disclosure, step S208 is implemented in a plurality of ways. For example, the router MAC address type can be identified based on any of the previous information, or can be identified based on any combination of two or three of the previous information. This is further described in detail below with reference to an optional embodiment.

In a first case, the router MAC address type can be identified based on one of the previous information in the following way:

In an example in which the router MAC address type is identified based on the number of users of the router that is to be identified, when the number of users accessing the router is less than a first threshold, the router MAC address type is identified as a residential router; and when the number of users accessing the router is greater than a second threshold and less than a third threshold, the router MAC address type is identified as a business router.

In an example in which the router MAC address type is identified based on the total number of accesses, when the total number of accesses of all users accessing the router is greater than a fourth threshold, the router MAC address type is identified as a business router.

In an example in which the router MAC address type is identified based on the number of successful accesses, when the number of successful accesses is greater than a fifth threshold, the router MAC address type is identified as a residential router.

In a second situation, the router MAC address type can be determined using a method of priority or weight of the information or using an election method.

In a priority-based implementation, information to be used can be determined in descending order of priorities. For example, when priorities of the number of users, the total number of accesses, and the number of successful accesses are in a descending order, the number of users can be used to identify the router MAC address. If the number of users does not satisfy a requirement or the number of users is not determined, the total number of accesses with a second priority can be used. If the total number of accesses does not satisfy a requirement, the number of successful accesses is used. An order of priority is not limited to the previously described example, but can be based on other particular implementations.

In a weight-based implementation, different weights can be provided for different pieces of information. Two or three pieces of information can be used for weighted calculation to identify the router MAC address type. For example, in an example in which the three pieces of information are used, three letters A, B, and C can respectively represent the number of users, the total number of accesses, and the number of successful accesses, a, b, and c can respectively represent weights of the three pieces of information, S represents a total weighted value, and S=a*A+b*B+c*C. A value S is compared with a predetermined threshold to identify the router MAC address type based on a comparison result. For example, when S is greater than the predetermined threshold, the router MAC address type of the router is identified as a business router; when S is less than the predetermined threshold, the router MAC address type of the router is identified as a residential router. It should be noted that the weighted calculation and determination for any two of the three pieces of information can be similarly performed.

In the election implementation, the election can be implemented based on an election algorithms including, but is not limited to, a bully algorithm or a loop algorithm.

In addition to the previously described implementations, other implementations can be used. For example when the number of users is less than a first threshold, and the total number of accesses is within a value interval between a sixth threshold and a seventh threshold, the router MAC address type can be identified as a residential router; and when the total number of accesses is greater than the seventh threshold, and the number of users is greater than the first threshold, the router MAC address type is identified as a business router.

In an optional embodiment, the threshold can be further used to further identify the router MAC address type. For example, when the total number of accesses is within the value interval, but the number of users is greater than the first threshold, the router can be identified as a "suspected residential router". Alternatively, when the total number of accesses is less than the first threshold, the router can be identified as a router of another type. Then, the router can be subsequently processed based on the identification result. For example, the router can be further identified based on a predetermined rule, or corresponding information can be pushed to the router based on a predetermined policy, etc.

In an optional embodiment, more details about residential router MAC address type can be further identified. For example, when the router MAC address type is the residential router, a number of accesses of the router on a workday and a number of accesses of the router on a non-workday within a fourth predetermined period are obtained; and a residential type corresponding to the residential router is further identified based on a comparison between the predetermined threshold and a ratio of the number of accesses of the router on a workday to the number of accesses of the router on a non-workday. For example, when the ratio is less than the predetermined threshold, the residential type can be identified as a work-type residence. If the ratio is greater than the predetermined threshold, the residential type can be identified as a living-type residence.

For another example, a number of accesses of the router in a specific time period per day within a fifth predetermined period and a number of accesses per day within the fifth predetermined period are obtained; a ratio of the number of accesses of the router in a specific time period per day to the number of accesses per day is obtained, and a residential type corresponding to the residential router is further identified based on a comparison between the ratio and the predetermined threshold. For example, when the ratio is less than the predetermined threshold, the residential type is identified as a work-type residence that the user leaves home for work on a workday. If the portion is greater than the predetermined threshold, the residential type is identified as a living-type residence that a user stays at home on a workday.

Based on the idea of this embodiment of the present disclosure, the router MAC address type can be further identified based on other collected information. For example, duration of accessing the router by a residential on the workday can be collected, and when the duration is greater than a predetermined threshold, the residential is determined as a residential accessing the router overtime on the workday.

It should be noted that a specific name of the router MAC address type in this embodiment of the present disclosure such as the "residential router" and the "business router" is merely used to describe and distinguish between different MAC address types, and does not constitute a limitation on a router type. The "residential router" and the "business router" can be understood as two different types (a first type and a second type).

Optionally, the first predetermined period, the second predetermined period, and the third predetermined period can be a same period or different periods. The fourth predetermined period and the fifth predetermined period can be the same period or different periods. The first predetermined period, the second predetermined period, and the third predetermined period can be a sub-period of the fourth predetermined period or the fifth predetermined period. For example, the first predetermined period, the second predetermined period, or the third predetermined period can be obtained as a portion of the fourth predetermined period or the fifth predetermined period. As another example, when the fourth predetermined period or the fifth predetermined period is a month, the first predetermined period, the second predetermined period, or the third predetermined period can be a day or a week in this month. When the fourth predetermined period or the fifth predetermined period is a quarter, the first predetermined period, the second predetermined period, or the third predetermined period can be a month in this quarter, etc.

According to the method of FIG. 2, a number of users accessing the router that is to be identified within a predetermined period, a total number of accesses of all users accessing the router that is to be identified within a predetermined period, and a number of successful accesses of a specific user accessing the router within a predetermined period of the residential router are different from those of the business router. Therefore, the router MAC address type of the router can be identified based on the previous information, so as to resolve problems in related router MAC address type identification technologies, such as insufficient data, low data coverage, and relatively high difficulty in distinguishing a business from a residence to improve coverage and reduce complexity in identifying the router address type.

In an optional embodiment, before step S204 or after step S202, a public router MAC address can be removed to accurately identify a residential router or a business router. For example, before step S204, an identification device determines whether the router MAC address is a public router MAC address, and if yes, stops identifying the router MAC address type as the residential router or the business router. The router may be a public router. Therefore, in the example embodiment, before it is determined whether the router is a residential router or a business router, it is determined whether the router is the public router, so as to eliminate interference from the public router, thereby more quickly and accurately identifying the residential router or the business router. Optionally, the public router MAC address can be identified by detecting a feature field configured for the public router MAC address, or can be identified by counting and determining a number of accessing users in a predetermined period. For example, when the number of accessing users is greater than a predetermined threshold, it is determined that the router MAC address is a public router MAC address. In some examples, the predetermined threshold is greater than a maximum threshold of the number of successfully accessed users of the business router. In some cases, an existing public router MAC address library can be used to perform filtering on the router MAC address data included in the network interaction data. In these cases, the filtered router MAC address data does not include public router MAC address data. In these cases, step S204 can be expressed as follows: The relationship between the router MAC address and the user MAC address is determined based on the user MAC address data and the filtered router MAC address data.

In an optional embodiment, a number of times that a specific user successfully accesses the router in the predetermined period can be determined to obtain a number of repeated user accesses. As such, behavior of the specific user can be determined, to perform a related commercial application based on a behavior counting result of the user. For example, a roommate relationship can be identified by using the number of repeated user accesses. This is described in detail below.

Optionally, before the number of users successfully accessed the router within a counting time period is obtained, the method further includes: obtaining the user MAC address, a geographical location corresponding to the user MAC address, the router MAC address, and a geographical location corresponding to the router MAC address.

Optionally, the geographical location in this embodiment of the present disclosure can be represented as satellite positioning information such as longitude and latitude information and altitude information, or location information such as a city, a street, a business, and an office building. Optionally, a geographical location can be determined in a plurality of methods such as single measurement and averaging of measurement for a plurality of times. However, no limitation is constituted thereto. In some examples, a plurality of obtained GPS longitudes and latitudes of the router can be averaged based on historical data, to obtain an average GPS longitude and latitude of the router. A geographical location of the router is represented by the average GPS longitude and latitude.

In some examples, when the router MAC address type is the business router, a business router MAC address, a geographical location corresponding to the business router MAC address, the number of users successfully accessed the router, and the number of repeated user accesses are stored in a business MAC address library. In some examples, when the router MAC address type is the residential router, a residential router MAC address and a geographical location corresponding to the residential router MAC address are stored in a residential MAC address library.

As such, various O2O commercial applications can be performed based on router MAC addresses and router MAC address types stored in the business MAC address library, the residential MAC address library, and the public router MAC address library. For example, based on an identification result obtained in step S208, a message corresponding to the router MAC address type can be pushed to the router that is to be identified or the user accessing the router. However, no limitation is constituted thereto. For example, the following applications can be further implemented:

In an optional embodiment, a business can be recommended. Optionally, a recommendation method can be as follows:

It should be noted that the business can be recommended in a plurality of implementations. For example, (1) a business can be separately pushed to users satisfying a condition, or (2) a business can be pushed to users satisfying a condition together.

The method (1) can be implemented in the following way, but is not limited thereto: A geographical location of a first residential is selected from the residential MAC address library; if a distance between the geographical location of the first residential and a geographical location of a business is less than a specific distance, description information of the business is pushed to the first residence. A geographical location of a second residence is selected from the residential MAC address library, determining is performed, and description information is pushed to the second residence, and so on.

The method (2) can be implemented in the following way, but is not limited thereto: The geographical location of the business is obtained from the merchant MAC address library, those residences whose distances from the geographical location of the business are less than a specific distance are obtained by means of screening, and the description information of the business is pushed to all the users obtained by means of screening together. The specified distance can be flexibly set based on an actual requirement, for example, can be set to 500 meters, 1 kilometer, 2 kilometers, etc.

It should be noted that the description information can be a name, an operation scope, a characteristic, a route, etc. of the business, but is not limited thereto.

In another optional embodiment, a relationship (for example, a colleague relationship or a roommate relationship) between several users connected to a router can be identified. A roommate relationship is used as an example for description. A method for identifying a roommate relationship can be: obtaining MAC addresses of residential routers successfully accessed by at least two users; determining whether the MAC addresses of the residential routers successfully accessed by the at least two users are the same; if yes, determining whether a number of repeated accesses of the MAC address of the residential router successfully accessed by the at least two users is greater than a predetermined number of repeated accesses; and if yes, determining that the at least two users are roommates.

In another optional embodiment, a customer volume of a business can be monitored, and a monitoring method can be: obtaining, from the business MAC address library, a number of users successfully accessed a router of a specific business; and monitoring a customer volume of the specific business by using the number of users.

In this embodiment, the customer volume of the business is monitored by using the number of users successfully accessed the router of the business, to obtain a change of the customer volume of the business within a period of time. For a user, the user can learn the popularity of the business based on the change of the customer volume to determine whether to use the business. For the business, the business can learn a recent status of its business based on the change of the customer volume. This can effectively help the business to analyze why the customer volume has decreased recently or why the customer volume has increased recently, so as to facilitate development of the business.

In an optional embodiment, a frequent customer can be identified for the business, and an identification method can include: obtaining, from the business MAC address library, a number of repeated user accesses of a specific user successfully accessed a specific business router; comparing the number of repeated user accesses of the specific user with a second predetermined threshold; and if the number of repeated user accesses is greater than the second predetermined threshold, determining that the specific user is a frequent customer of the specific business.

To help understand the previously described methods, an optional embodiment is described. This optional embodiment can collect a user MAC address, a router MAC address, a geographical location corresponding to the user MAC address, and a geographical location corresponding to the router MAC address, and can periodically collect and update the addresses. This optional embodiment can also store historical data, and retain the historical data. This optional embodiment also has (or is in communication with) a big data processing platform to calculate a large amount of data. A detailed description of an example of how this optional embodiment operates is provided with reference to FIG. 3:

S302: A server performs data interaction, that is, a user can not only connect to a system, but also can perform network interworking and interaction with the system.

S304: Collect data, that is, obtain a user MAC address and a successfully accessed router MAC address, and corresponding GPS longitude and latitude address information.

S306: Store historical data, that is, store historical data periodically collected in step S304; determine whether a stored router is a public router; if the router is not a public router, perform step S308; and if the router is a public router, perform step S310.

S308: Perform ETL calculation on a relationship between the router MAC address and the user MAC address, that is, determine an access frequency of a MAC address by a user, and a number of users successfully accessed a router and the frequency of successful accesses. In some examples, based on the historical data, S308 can perform ETL calculation on a number of users successfully accessed a router and a number of successful accesses within a period of time. In some examples, S308 can calculate average GPS longitude and latitude address information of the router based on the historical data.

S310: Maintain a public router MAC address library, for example, MAC addresses of public routers such as CHINA UNICOM, CHINA TELECOM, and high-speed railway free WIFI.

S312: Identify and determine the router MAC address, that is, identify the router MAC address to determine whether the router is a business router or a residential router. An identification and determining method can include the following: a maximum threshold of a number of users successfully accessed the residential router per day is set to R; a minimum threshold of a number of users successfully accessed the business router per day is set to M1, and a maximum threshold is set to M2; router data from the public router MAC address library is removed; determination is successively performed on all routers, if an average number of users successfully accessed the router per day is less than R, the router is determined as a residential router, and if the number of users successfully accessed the router per day is greater than M1 and less than M2, the router is determined as a business router; in other cases, it is determined that data cannot be identified.

S314: If the router is determined as the business router, store data such as a business MAC address, GPS longitude and latitude data, an average number of accessing users per day, and a frequency of repeated user accesses, to a business MAC address library.

S316: If the router is determined as a residential router, store a residential MAC address and GPS longitude and latitude data to a residential MAC address library. In some examples, data such as a residential type, an access rate percentage of the router in different time periods, and a proportion of the number of accesses on a workday to the number of accesses on a non-workday can also be stored in the residential MAC address library.

S318: Perform various O2O commercial applications based on the generated public router MAC address library, business MAC address library, and residential MAC address library, where the commercial applications include but are not limited to the following activities: business recommendation, for example, a business is recommended to nearby residences; roommate identification, for example, several persons often accessing a same router are usually roommates; customer volume monitoring of a business, for example, an average customer volume per day can be monitored by using an average number of users accessing a business router per day; and frequent customer identification of a business, for example, a user that often visits the business and accesses a router can be a frequent customer.

Figure 3:
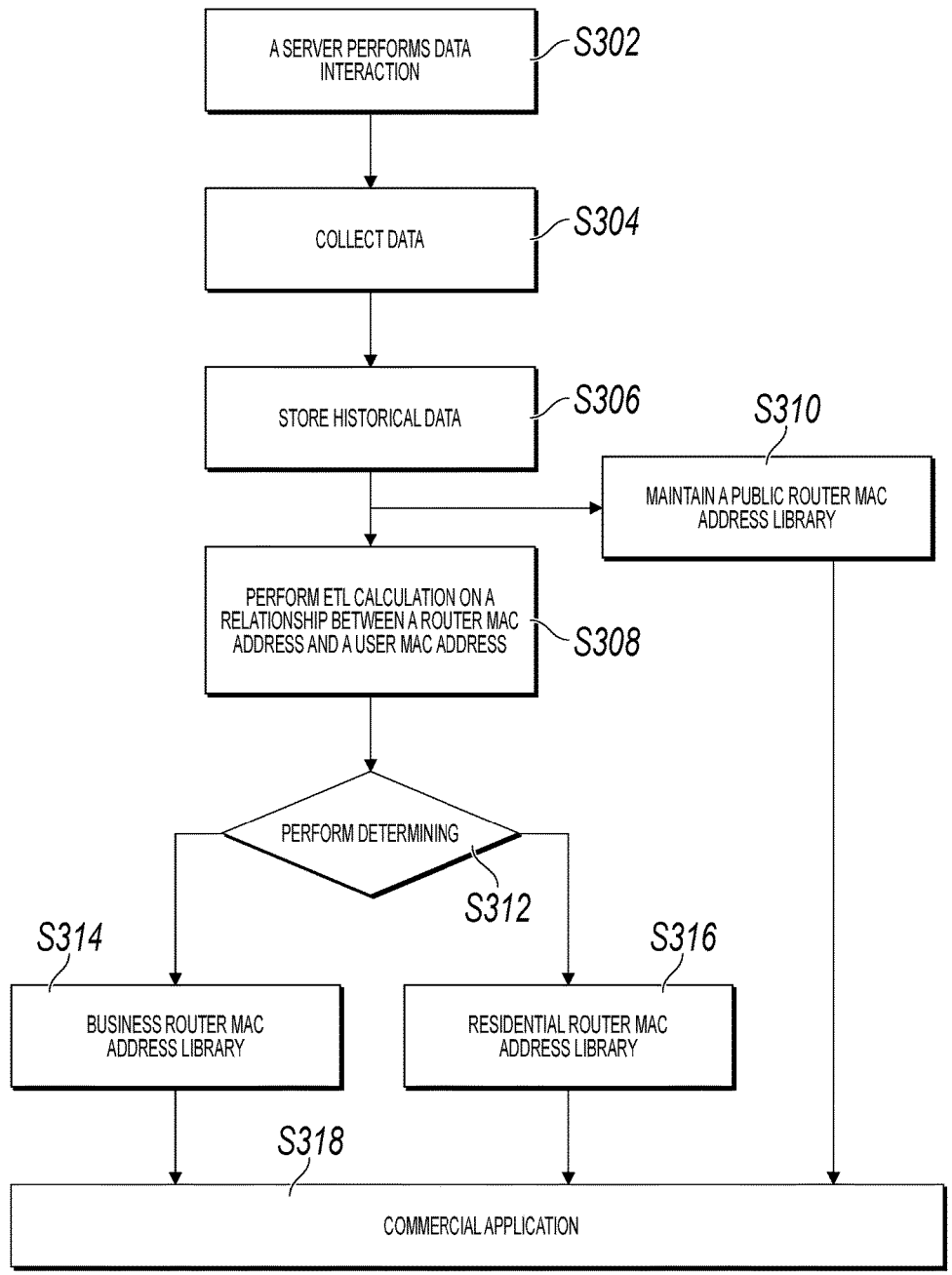
FIG. 3 is a schematic flowchart of a router address type identification method, according to an embodiment of the present disclosure.

It should be noted that the embodiments shown in FIG. 2 and FIG. 3 and the methods in the optional embodiments thereof can be performed on a server side, or can be performed on a client side. For example, when the methods are performed on the client side, the methods can be performed by using a client application running on user equipment.

It should be noted that, to make the description brief, the previously described method embodiments are described in a particular order. However, a person skilled in the art should appreciate that the methods are not limited to the described order, because according to the present disclosure, some steps can be performed in other orders or performed simultaneously. Based on the descriptions of the implementations, a person skilled in the art can understand that the described methods can be implemented by software or hardware. The software can be stored in a storage medium (for example, a ROM/RAM, a magnetic disk, or an optical disc), and can include several instructions for instructing a terminal device (which can be a mobile phone, a computer, a server, or a network device) to perform the embodiments of the present disclosure.

Embodiment 2

Figure 4:
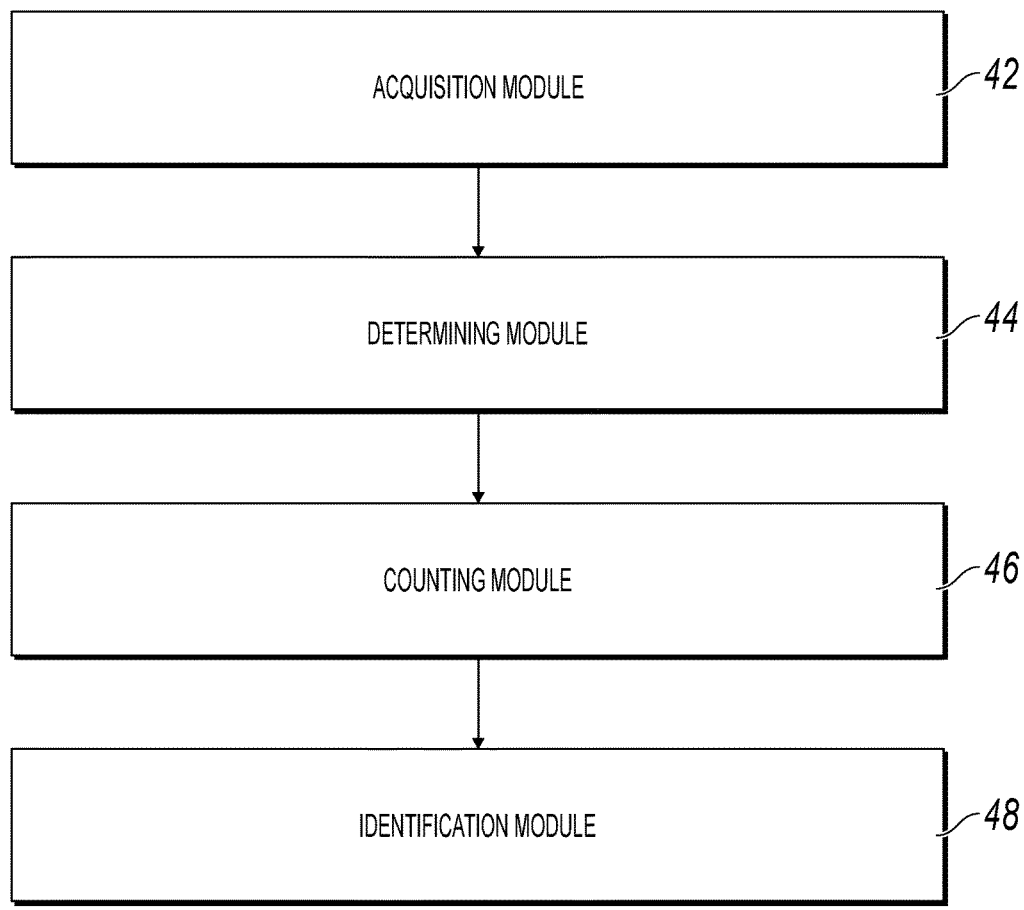
FIG. 4 is a structural block diagram of an optional router address type identification apparatus, according to an embodiment of the present disclosure.

This embodiment of the present disclosure further provides an apparatus for implementing the router address type identification method described in the previous section. FIG. 4 is a structural block diagram of an optional router address type identification apparatus according to an embodiment of the present disclosure. As shown in FIG. 4, the apparatus includes: an acquisition module 42, a determining module 44, a counting module 46, and an identification module 48.

The acquisition module 42 is configured to acquire network interaction data collected by a server, where the network interaction data includes user Media Access Control (MAC) address data and router MAC address data.

The determining module 44 is configured to determine a relationship between a router MAC address and a user MAC address based on the user MAC address data and the router MAC address data.

The counting module 46 is configured to count, based on the relationship between the router MAC address and the user MAC address, an access parameter obtained after each user MAC address in the user MAC address data accesses a router that is to be identified corresponding to the router MAC address within a predetermined period.

Optionally, the access parameter is used to reflect information about a number of users accessing the router and/or an access frequency. For example, the access parameter includes one or any combination of the following listed information: a number of users accessing the router within a first predetermined period, a total number of accesses of all users accessing the router within a second predetermined period, and a number of successful accesses of a specific user accessing the router within a third predetermined period.

The identification module 48 is configured to identify a router MAC address type of the router based on a comparison between a counting result and a predetermined threshold.

In an optional embodiment of the present disclosure, different thresholds can be set to identify the router MAC address type, for example, can be used to identify a residential router or a business router. Specifically, the identification module 48 is further configured to: when the number of users accessing the router is less than a first threshold, identify the router MAC address type as a residential router; and when the number of users accessing the router is greater than a second threshold and less than a third threshold, identify the router MAC address type as a business router.

Optionally, the identification module 48 is further configured to: when the total number of user accesses is greater than a fourth threshold, identify the router MAC address type as a business router.

Optionally, the identification module 48 is further configured to: when the number of successful accesses is greater than a fifth threshold, identify the router MAC address type as a residential router.

Optionally, the identification module 48 is further configured to: when the number of users is less than a first threshold, and the total number of accesses falls within a value interval between a sixth threshold and a seventh threshold, identify the router MAC address type as a residential router; and when the total number of accesses is greater than the seventh threshold, and the number of users is greater than the first threshold, identify the router MAC address type as a business router.

The acquisition module 42 is further configured to: when the router MAC address type is the residential router, obtain the number of accesses to the router on a workday and the number of accesses to the router on a non-workday within a fourth predetermined period; or obtain the number of accesses to the router in a specific time period per day within a fifth predetermined period and an average number of accesses per day within the fifth predetermined period. Correspondingly, the identification module 48 is further configured to: further identify, based on a comparison between the predetermined threshold and a proportion of the number of accesses of the router on a workday to the number of accesses of the router on a non-workday, a residential type corresponding to the residential router; or further identify, based on a comparison between the predetermined threshold and a proportion of the number of accesses of the router in a specific time period per day to the number of accesses per day, a residential type corresponding to the residential router.

Figure 5:
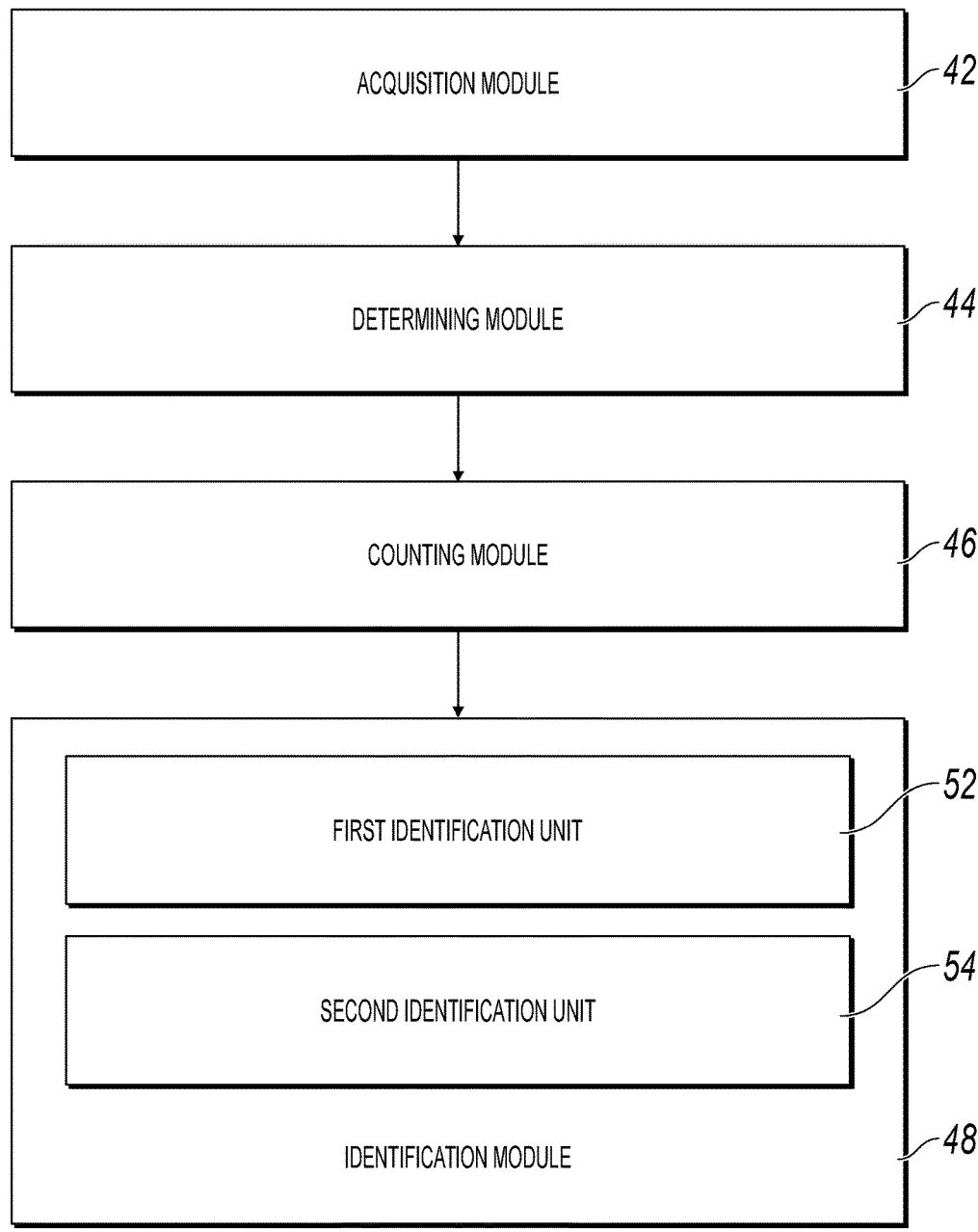
FIG. 5 is another structural block diagram of an optional router address type identification apparatus, according to an embodiment of the present disclosure.

Optionally, as shown in FIG. 5, the previously described functions of the identification module 48 can be performed by, for example, using two units included in the identification module 48, that is, a first identification unit 52 and a second identification unit 54. For example, the first identification unit 52 is configured to further identify, based on a comparison between a third predetermined threshold and the proportion of the number of accesses of the router on a workday to the number of accesses of the router on a non-workday, the residential type corresponding to the residential router. The second identification unit 54 is configured to further identify, based on the result of comparison between the predetermined threshold and the proportion of the number of accesses of the router in a specific time period per day to the number of accesses per day, the residential type corresponding to the residential router.

Technical problems of deficient data, low data coverage, a relatively high difficulty in distinguishing a business from a residential, etc. in a router MAC address type identification scheme in a related technology can be resolved by using the functions implemented by the described modules, thereby improving coverage and reducing a difficulty in identifying the router address type.

Figure 6:
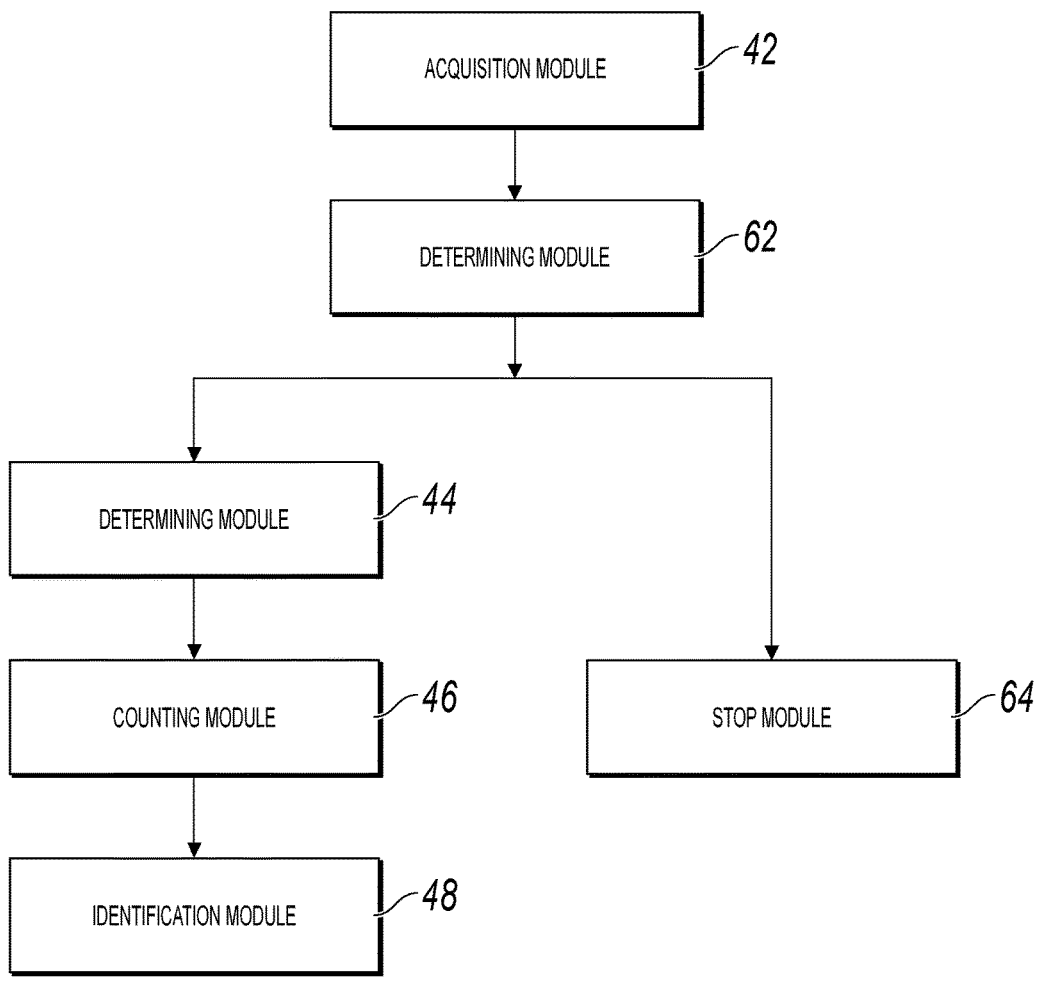
FIG. 6 is another structural block diagram of an optional router address type identification apparatus, according to an embodiment of the present disclosure.

In an optional embodiment, a public router MAC address can be removed to accurately identify a residential router or a business router. FIG. 6 is another structural block diagram of an optional router address type identification apparatus according to an embodiment of the present disclosure. As shown in FIG. 6, the apparatus can further include: a determining module 62, connected to the acquisition module 42 and configured to determine whether the router MAC address is a public router MAC address; and a stop module 64, connected to the determining module 62 and configured to: when the router MAC address is a public router MAC address, stop identifying the router MAC address type as a residential router or a business router. The router may be a public router. Therefore, in some implementations, before it is determined whether the router is the residential router or the business router, it is first determined whether the router is a public router, so as to eliminate interference from the public router, thereby more quickly and accurately identifying the residential router or the business router. Optionally, the public router MAC address can be identified by detecting a feature field configured for the public router MAC address, or can be identified by counting and determining a number of accessing users in a predetermined period. For example, when the number of accessing users is greater than a predetermined threshold, it can be determined that the router MAC address is a public router MAC address. In some examples, the predetermined threshold is greater than a maximum threshold of the number of successfully accessed users of the business router.

Figure 7:
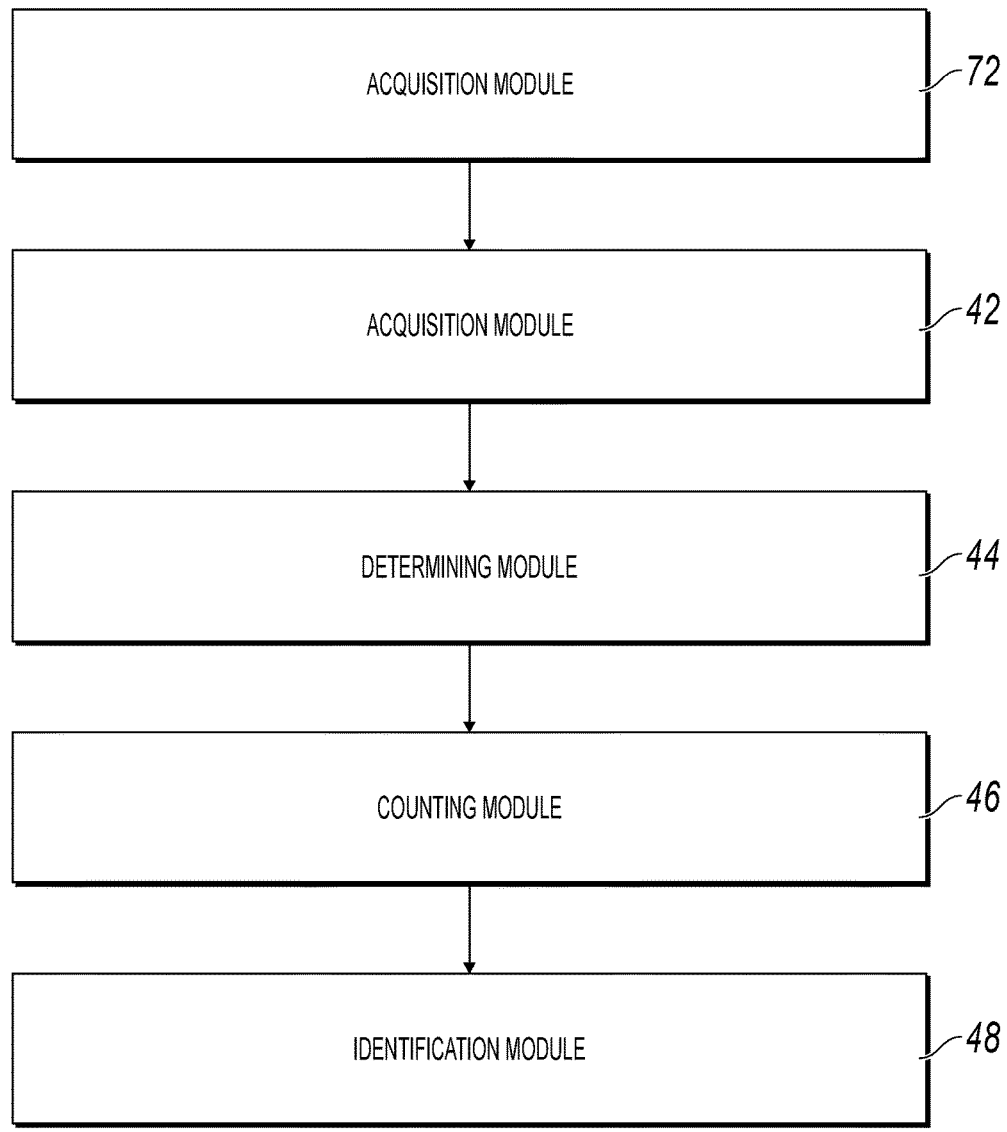
FIG. 7 is another structural block diagram of an optional router address type identification apparatus, according to an embodiment of the present disclosure.

In an optional embodiment, the acquisition module 42 is further configured to count a number of times that a specific user successfully accesses the router in the predetermined period, to obtain a number of repeated user accesses. As such, behavior of the specific user can be determined, to perform a related commercial application based on a behavior counting result of the user. For example, a roommate relationship can be identified by using the number of repeated user accesses. This is described in detail below. Optionally, FIG. 7 is another structural block diagram of an optional router address type identification apparatus according to an embodiment of the present disclosure. As shown in FIG. 7, the apparatus further includes an acquisition module 72, connected to the acquisition module 42 and configured to obtain the user MAC address, a geographical location corresponding to the user MAC address, the router MAC address, and a geographical location corresponding to the router MAC address. Optionally, the geographical location in this embodiment of the present disclosure can be represented as satellite positioning information such as longitude and latitude information and altitude information, or location information such as a city, a street, a merchant, and an office building. However, no limitation is constituted thereto.

Figure 8:
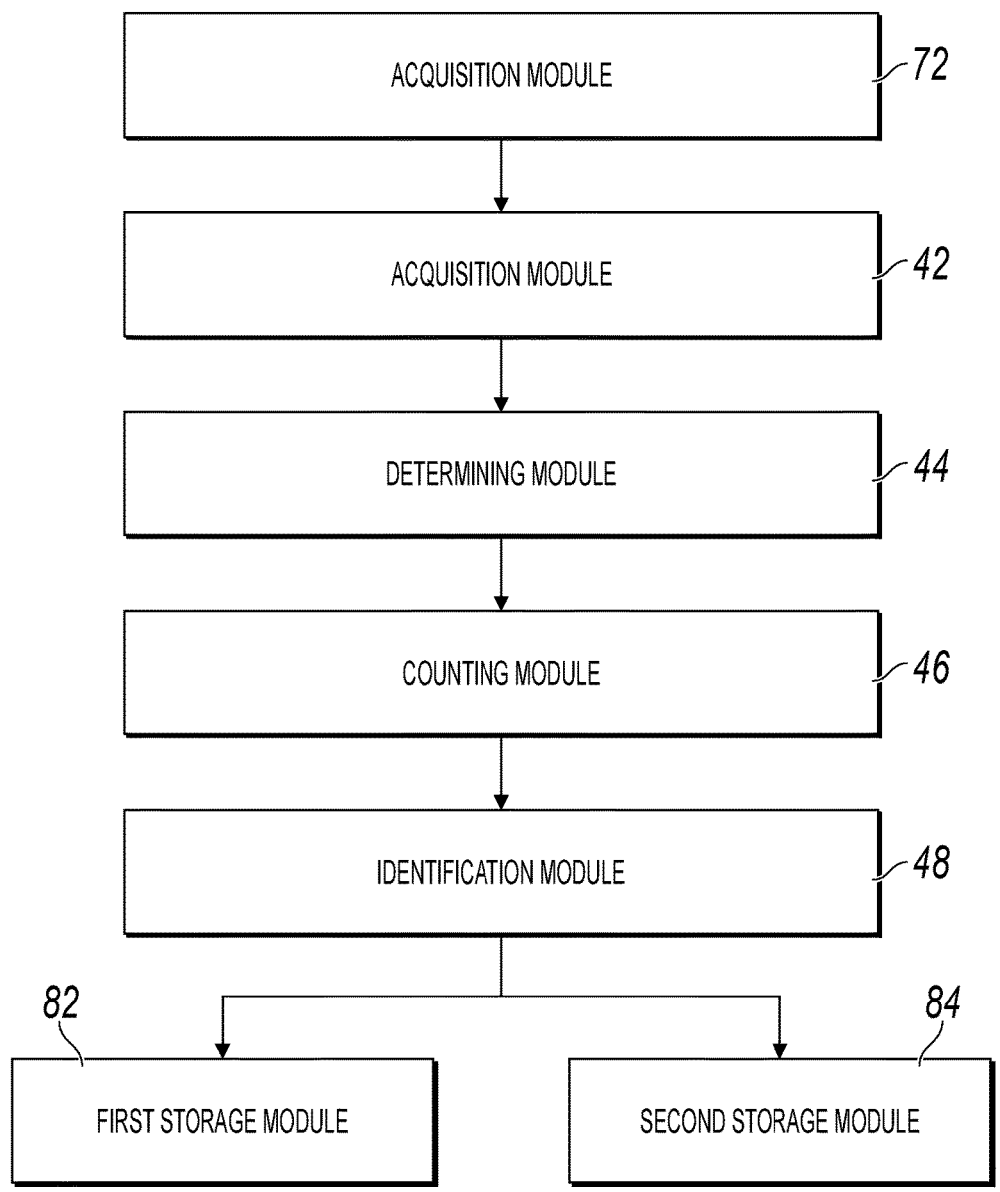
FIG. 8 is another structural block diagram of an optional router address type identification apparatus, according to an embodiment of the present disclosure.

Optionally, FIG. 8 is another structural block diagram of an optional router address type identification apparatus according to an embodiment of the present disclosure. As shown in FIG. 8, the apparatus further includes a first storage module 82 and a second storage module 84. The first storage module 82 is configured to: when the router MAC address type is the business router, store a business router MAC address, a geographical location corresponding to the business router MAC address, the number of users successfully accessed the router, and the number of repeated user accesses, in a business MAC address library. The second storage module 84 is configured to: when the router MAC address type is the residential router, store a residential router MAC address and a geographical location corresponding to the residential router MAC address, in a residential MAC address library.

As such, various O2O commercial applications can be performed based on router MAC addresses and router MAC address types stored in the business MAC address library and the residential MAC address library that are obtained by the apparatus, and the public router MAC address library. The following provides a description by using an example.

In an optional embodiment, a business can be recommended: A geographical location corresponding to a router MAC address of a specific merchant is obtained from a business MAC address library; a geographical location corresponding to a residential router MAC address is obtained from a residential MAC address library; it is determined whether a distance between the geographic location corresponding to the MAC address of the specific merchant and the geographic location corresponding to the residential router MAC address is less than a specific distance; and if yes, description information of the specific merchant is pushed to the residential router (or a user accessing the residential router).

It should be noted that the business can be recommended in a plurality of implementations. For example, (1) a business can be separately pushed to users satisfying a condition, or (2) a business can be pushed to users satisfying a condition together.

Method (1) can be implemented in the following way, but is not limited thereto: A geographical location of a first residential is selected from the residential MAC address library; if a distance between the geographical location of the first residential and a geographical location of a business is less than a specific distance, description information of the business is pushed to the first residential. A geographical location of a second residential is selected from the residential MAC address library, determining is performed, and description information is pushed to the second residential, and so on.

Method (2) can be implemented in the following way, but is not limited thereto: The geographical location of the business is obtained from the merchant MAC address library, those residences with distances from the geographical location of the business less than a specific distance can be obtained by filtering, and the description of the business is pushed to the users obtained by filtering. The specific distance can be set based on an actual requirement, for example, it can be set to 500 meters, 1 kilometer, 2 kilometers, etc.

It should be noted that the business description can include a name, an operation scope, a characteristic, a route to the business, etc.

In another optional embodiment, a relationship (for example, a colleague relationship or a roommate relationship) between several users connected to a router can be identified. Here, a roommate relationship is used as an example. A roommate relationship can be identified as follows: MAC addresses of residential routers successfully accessed by at least two users are obtained; it is determined whether the MAC addresses of the residential routers successfully accessed by the at least two users are the same; if yes, it is determined whether a number of repeated accesses of the MAC address of the residential router successfully accessed by the at least two users is greater than a predetermined number of repeated accesses; and if yes, it is determined that the at least two users are roommates.

In an optional embodiment, a customer volume of a business can be monitored as follows: A number of users successfully accessed a router of a specified business is obtained from the business MAC address library; and a customer volume of the specified business is monitored by using the number of users.

In this embodiment, the customer volume of the business is monitored by using the number of users successfully accessed the router of the business, to obtain a change of the customer volume of the business within a period of time. For a user, the user can learn of a popularity degree of the business based on the change of the customer volume, to determine whether to enter the business for consumption. For the business, the business can learn of a recent business status of the business based on a change of the customer volume. This can effectively help the business to analyze why the customer volume has decreased recently or why the customer volume has increased recently, so as to help development of the business.

In an optional embodiment, a frequent customer can be identified for the business: A number of repeated user accesses of a specific user successfully accessed a specific business router is obtained from the business MAC address library; the number of repeated user accesses of the specific user is compared with a second predetermined threshold; and if the number of repeated user accesses is greater than the second predetermined threshold, it is determined that the specific user is a frequent customer of the specific business.

Embodiment 3

This embodiment of the present disclosure can provide a computer terminal. The computer terminal can be any computer terminal device in a computer terminal group. Optionally, in this embodiment, the computer terminal can be replaced with a terminal device such as a mobile terminal.

Optionally, in this embodiment, the computer terminal can be located in at least one network device in a plurality of network devices of a computer network.

In this embodiment, the computer terminal can perform program code of the following steps in a router address type identification method of an application program: obtaining network interaction data collected by a server, where the network interaction data includes user Media Access Control (MAC) address data and router MAC address data; determining a relationship between a router MAC address and a user MAC address based on the user MAC address data and the router MAC address data; counting, based on the relationship between the router MAC address and the user MAC address, one or any combination of the following listed information: a number of users accessing the router within a first predetermined period, a total number of accesses of all users accessing the router within a second predetermined period, and a number of successful accesses of a specific user accessing the router within a third predetermined period; and identifying a router MAC address type of the router based on a comparison between a counting result and a predetermined threshold.

Figure 9:
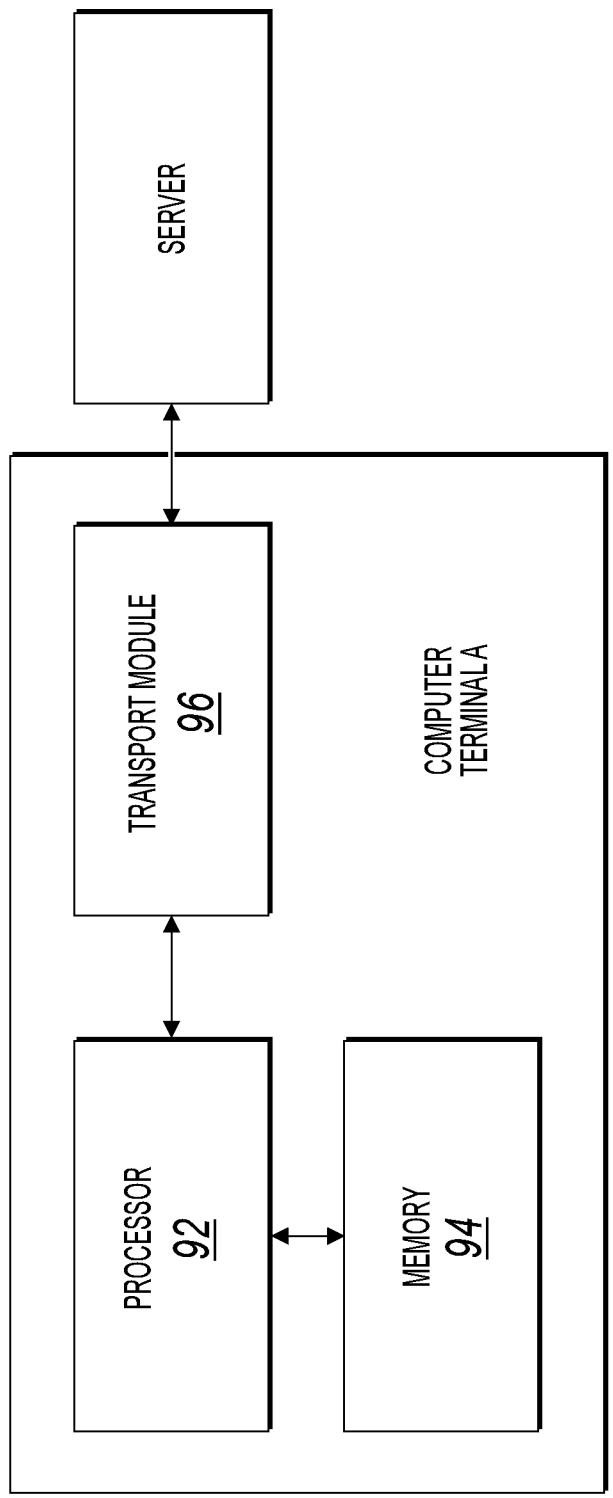
FIG. 9 is a structural block diagram of a computing device according to an embodiment of the present disclosure.

Optionally, FIG. 9 is a structural block diagram of a computer terminal according to an embodiment of the present disclosure. As shown in FIG. 9, a computer terminal A can include one or more (only one is shown in the figure) processors 92, a memory 94, and a transport module 96.

The memory 94 can be configured to store a software program and a module, for example, a program instruction/module corresponding to the router address type identification method and apparatus in the embodiments of the present disclosure. The processor runs the software program and the module stored in the memory, to execute various applications and data processing, that is, implement the router address type identification method. The memory 94 can include a high-speed random access memory, or can include a non-volatile memory such as one or more magnetic storage apparatuses, a flash memory, or another non-volatile solid-state memory. In some examples, the memory 94 can further include a memory remotely disposed from the processor. The remote memory can connect to terminal A by using a network. The network includes but is not limited to the Internet, an intranet, a local area network, a mobile communication network, and a combination thereof.

The transport module 96 is configured to receive or send data by using a network. The network can specifically include a wired network and a wireless network. In an example, the transport module 96 includes a network interface card (NIC), and the network interface card can connect to another network device and a router by using a cable, to communicate with Internet or a local area network. In an example, the transport module 96 is a radio frequency (RF) module, and the RF module is configured to communicate with Internet in a wireless way.

The memory 94 can store a predetermined action condition, information about a predetermined authorized user, and an application program.

The processor 92 can invoke the information and the application program stored in the memory 94 by using the transport module 96, to perform the following steps: when the number of users accessing the router is less than a first threshold, identifying the router MAC address type as a residential router; and when the number of users accessing the router is greater than a second threshold and less than a third threshold, identifying the router MAC address type as a business router.

Optionally, the processor 92 can further perform program code of the following steps: when the total number of accesses of all users is greater than a fourth threshold, identifying the router MAC address type as a business router; or when the number of successful accesses is greater than a fifth threshold, identifying the router MAC address type as a residential router.

Optionally, the processor 92 can further perform program code of the following steps: when the number of users is less than a first threshold, and the total number of accesses falls within a value interval between a sixth threshold and a seventh threshold, identifying the router MAC address type as a residential router; and when the total number of accesses is greater than the seventh threshold, and the number of users is greater than the first threshold, identifying the router MAC address type as a business router.

Optionally, the processor 92 can further perform program code of the following steps: when the router MAC address type is the residential router, obtaining a number of accesses of the router on a workday and a number of accesses of the router on a non-workday within a fourth predetermined period; and further identifying, based on a comparison between the predetermined threshold and a proportion of the number of accesses of the router on a workday to the number of accesses of the router on a non-workday, a residential type corresponding to the residential router; or when the router MAC address type is the residential router, obtaining a number of accesses of the router in a specific time period per day within a fifth predetermined period and a number of accesses per day within the fifth predetermined period; and obtaining a proportion of the number of accesses of the router in a specific time period per day to the number of accesses per day, and further identifying, based on a comparison between the proportion and the predetermined threshold, a residential type corresponding to the residential router.

Optionally, the processor 92 can further perform program code of the following steps: performing filtering on the router MAC address data included in the network interaction data by using a public router MAC address library, where filtered router MAC address data does not include public router MAC address data; and determining the relationship between the router MAC address and the user MAC address based on the user MAC address data and the filtered router MAC address data.

Optionally, the processor 92 can further perform program code of the following steps: obtaining, from a business MAC address library, a geographical location corresponding to a router MAC address of a specific merchant; obtaining, from a residential MAC address library, a geographical location corresponding to a residential router MAC address; determining whether a distance between the geographic location corresponding to the MAC address of the specific merchant and the geographic location corresponding to the residential router MAC address is less than a specific distance; and if yes, pushing description information of the specific merchant to the residential.

Optionally, the processor 92 can further perform program code of the following steps: obtaining MAC addresses of residential routers successfully accessed by at least two users; determining whether the MAC addresses of the residential routers successfully accessed by the at least two users are the same; if yes, determining whether a number of repeated accesses of the MAC address of the residential router successfully accessed by the at least two users is greater than a predetermined number of repeated accesses; and if yes, determining that the at least two users are roommates.

Optionally, the processor 92 can further perform program code of the following steps: determining location information of the router based on location information of a user accessing the router; and storing the router MAC address type and the location information of the router in a database.

Optionally, the processor 92 can further perform program code of the following step: pushing, based on an identification result, a message corresponding to the router MAC address type to the router or a user accessing the router.

This embodiment of the present disclosure provides solutions of a router address type identification method. A router type is identified based on an obtained number of successfully accessed users of a router, so as to achieve objectives of improving coverage and efficiently distinguishing between router address types, thereby resolving technical problems of deficient data, low data coverage, a relatively high difficulty in distinguishing a business from a residential, etc. in a MAC address type identification scheme in a related technology.

A person of ordinary skill in the art can understand that the structure shown in FIG. 9 is merely an example, and the computer terminal can also be a terminal device such as a smartphone (such as an Android mobile phone or an iOS mobile phone), a tablet computer, a handheld computer, a mobile Internet device (Mobile Internet Devices, MID), or a PAD. FIG. 9 does not constitute a limitation on a structure of the computer terminal. For example, the computer terminal A can further include more or fewer components (such as a network interface and a display apparatus) than those shown in FIG. 9, or can have a configuration different from that in FIG. 9.

A person of ordinary skill in the art can understand that all or some of the steps of the methods in the embodiments can be implemented by performing a program using relevant hardware. The program can be stored in a computer readable storage medium. The storage medium can include a flash memory, a read-only memory (Read-Only Memory, ROM), a random access memory (Random Access Memory, RAM), a magnetic disk, an optical disc, etc.

Embodiment 4

This embodiment of the present disclosure further provides a storage medium. Optionally, in this embodiment, the storage medium can be configured to store program code executed by the router address type identification method provided in Embodiment 1.

Optionally, in this embodiment, the storage medium can be located in any computer terminal in a computer terminal group in a computer network, or can be located in any mobile terminal in a mobile terminal group.

Optionally, in this embodiment, the storage medium is configured to store program code used to perform the following steps: obtaining network interaction data collected by a server, where the network interaction data includes user Media Access Control (MAC) address data and router MAC address data; determining a relationship between a router MAC address and a user MAC address based on the user MAC address data and the router MAC address data; counting, based on the relationship between the router MAC address and the user MAC address, an access parameter obtained after each user MAC address in the user MAC address data accesses a router corresponding to the router MAC address within a predetermined period; and identifying a router MAC address type of the router based on a comparison between a counting result and a predetermined threshold.

Optionally, in this embodiment, the storage medium is configured to store program code used to perform the following step: when the number of users accessing the router is less than a first threshold, identifying the router MAC address type as a residential router; and when the number of users accessing the router is greater than a second threshold and less than a third threshold, identifying the router MAC address type as a business router; or when the total number of accesses of all users is greater than a fourth threshold, identifying the router MAC address type as a business router; or when the number of successful accesses is greater than a fifth threshold, identifying the router MAC address type as a residential router; or when the number of users is less than a first threshold, and the total number of accesses falls within a value interval between a sixth threshold and a seventh threshold, identifying the router MAC address type as a residential router; and when the total number of accesses is greater than the seventh threshold, and the number of users is greater than the first threshold, identifying the router MAC address type as a business router.

Optionally, in this embodiment, the storage medium is configured to store program code used to perform the following steps: when the router MAC address type is the residential router, obtaining a number of accesses of the router on a workday and a number of accesses of the router on a non-workday within a fourth predetermined period; and further identifying, based on a comparison between the predetermined threshold and a proportion of the number of accesses of the router on a workday to the number of accesses of the router on a non-workday, a residential type corresponding to the residential router; or when the router MAC address type is the residential router, obtaining a number of accesses of the router in a specific time period per day within a fifth predetermined period and a number of accesses per day within the fifth predetermined period; and obtaining a proportion of the number of accesses of the router in a specific time period per day to the number of accesses per day, and further identifying, based on a comparison between the proportion and the predetermined threshold, a residential type corresponding to the residential router.

Optionally, in this embodiment, the storage medium is configured to store program code used to perform the following steps: performing filtering on the router MAC address data in the network interaction data by using a public router MAC address library, where filtered router MAC address data does not include public router MAC address data; and determining the relationship between the router MAC address and the user MAC address based on the user MAC address data and the filtered router MAC address data.

Optionally, in this embodiment, the storage medium is configured to store program code used to perform the following step: before a number of users successfully accessed the router within a counting time period is obtained, obtaining the user MAC address, a geographical location corresponding to the user MAC address, the router MAC address, and a geographical location corresponding to the router MAC address.

Optionally, in this embodiment, the storage medium is configured to store program code used to perform the following steps: when the router MAC address type is the business router, storing a business router MAC address, a geographical location corresponding to the business router MAC address, the number of users successfully accessed the router, and the number of repeated user accesses in a business MAC address library; and when the router MAC address type is the residential router, storing a residential router MAC address and a geographical location corresponding to the residential router MAC address in a residential MAC address library.

Optionally, in this embodiment, the storage medium is configured to store program code used to perform the following steps: obtaining, from a business MAC address library, a geographical location corresponding to a router MAC address of a specific merchant; obtaining, from a residential MAC address library, a geographical location corresponding to a residential router MAC address; determining whether a distance between the geographic location corresponding to the MAC address of the specific merchant and the geographic location corresponding to the residential router MAC address is less than a specific distance; and if yes, pushing description information of the specific merchant to the residential.

Optionally, in this embodiment, the storage medium is configured to store program code used to perform the following steps: obtaining MAC addresses of residential routers successfully accessed by at least two users; determining whether the MAC addresses of the residential routers successfully accessed by the at least two users are the same; if yes, determining whether a number of repeated accesses of the MAC address of the residential router successfully accessed by the at least two users is greater than a predetermined number of repeated accesses; and if yes, determining that the at least two users are roommates.

Optionally, in this embodiment, the storage medium is configured to store program code used to perform the following steps: obtaining, from the business MAC address library, a number of users successfully accessed a router of a specific business; and monitoring a customer volume of the specific business by using the number of users.

Optionally, in this embodiment, the storage medium is configured to store program code used to perform the following steps: obtaining, from the business MAC address library, a number of repeated user accesses of a specific user successfully accessed a specific business router; comparing the number of repeated user accesses of the specific user with a second predetermined threshold; and if the number of repeated user accesses is greater than the second predetermined threshold, determining that the specific user is a frequent customer of the specific business.

The order of the embodiments of the present disclosure are merely for illustrative purposes, and are not intended to indicate priorities of the embodiments.

In the previously described embodiments of the present disclosure, the descriptions of the embodiments have respective focuses. For a part that is not described in detail in an embodiment, references can be made to related descriptions in other embodiments.

In the various embodiments provided in the present application, it should be understood that the disclosed technical content can be implemented in other ways. For example, the described apparatus embodiment is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the units or modules can be implemented in electronic or other forms.

The units described as separate parts can or cannot be physically separate, and parts displayed as units can or cannot be physical units, can be located in one position, or can be distributed on a plurality of network units. Some or all of the units can be selected based on actual requirements to achieve the objectives of the solutions of the embodiments.

In addition, functional units in the embodiments of the present disclosure can be integrated into one processing unit, or each of the units can exist alone physically, or at least two units are integrated into one unit. The integrated unit can be implemented in a form of hardware, or can be implemented in a form of a software functional unit.

When the integrated unit is implemented in the form of a software functional unit and sold or used as an independent product, the integrated unit can be stored in a computer-readable storage medium. Based on such an understanding, the technical solutions of the present disclosure essentially, or the part contributing to the prior art, or some or all of the technical solutions can be implemented in a form of a software product. The computer software product is stored in a storage medium, and includes several instructions for instructing a computer device (which can be a personal computer, a server, or a network device) to perform all or some of the steps of the methods described in the embodiments of the present disclosure. The storage medium includes: any medium that can store program code, such as a USB flash drive, a read-only memory (ROM, Read-Only Memory), a random access memory (RAM, Random Access Memory), a removable hard disk, a magnetic disk, or an optical disc.

The presented embodiments are merely example implementations of the present disclosure. It should be noted that a person of ordinary skill in the art can make several variations and improvements without departing from the idea of the present disclosure and the variations and improvements shall fall within the protection scope of the present disclosure.

Figure 10:
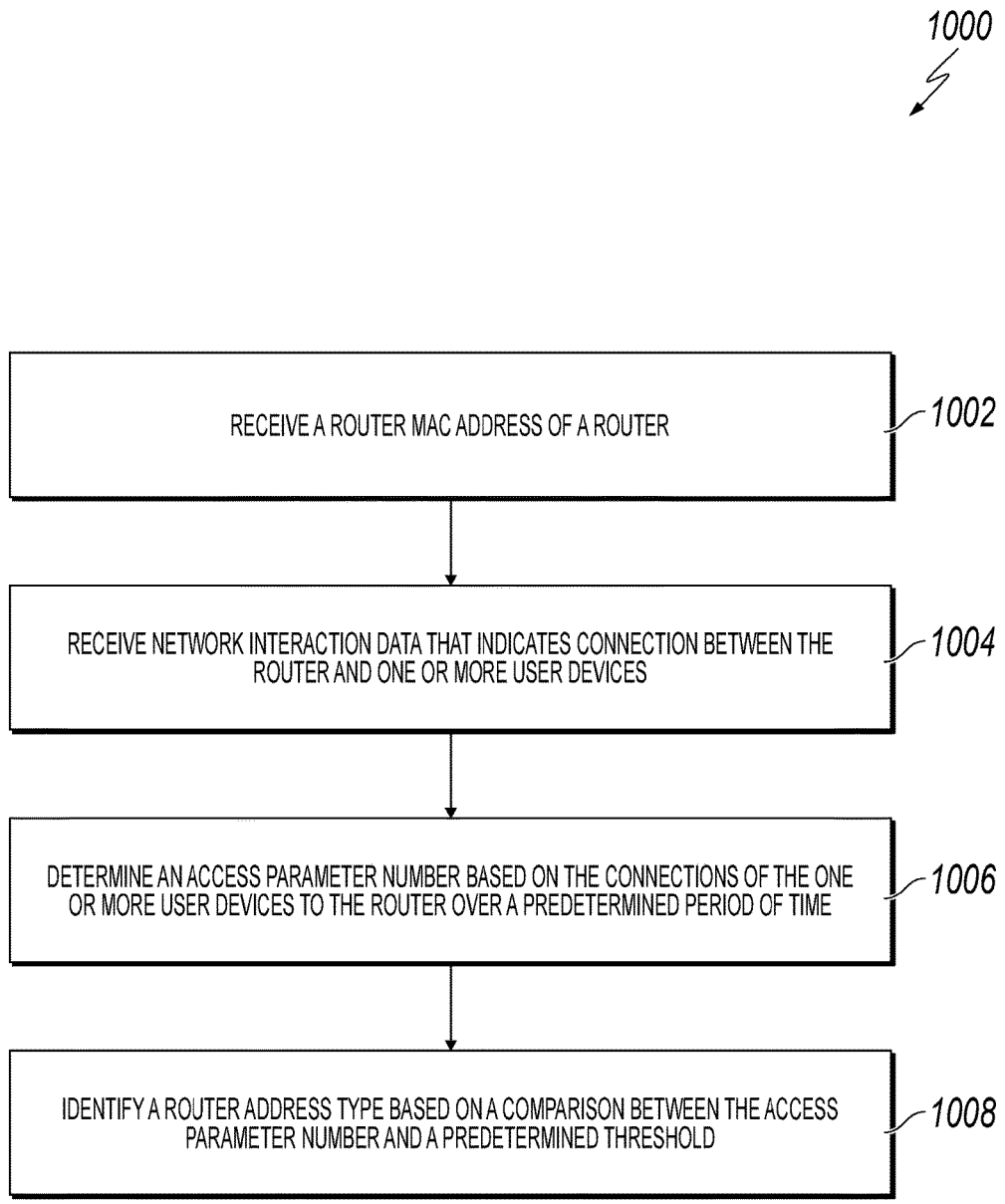
FIG. 10 is a flowchart illustrating an example method for identifying an address type of a router, according to the present disclosure.

FIG. 10 is a flowchart illustrating an example method 1000 for identifying an address type of a router, according to the present disclosure. For example, the method 1000 can identify whether router MAC address type of a router is a residential type (for example, the router is used for residential purposes or is used in a residential environment) or a business type (for example, the router is used for business purposes or is used in a business environment). For clarity of presentation, the description that follows generally describes method 1000 in the context of the other figures in this description. However, it will be understood that method 1000 may be performed, for example, by any suitable system, environment, software, and hardware, or a combination of systems, environments, software, and hardware, as appropriate. In some implementations, various steps of method 1000 can be run in parallel, in combination, in loops, or in any order. In some implementations, all communication between elements in method 1000 is encrypted (for example, using HTTPS).

At 1002, a router MAC address of a router is received. For example, the router MAC address can be received at a computer terminal (for example, the computer terminal 10 of FIG. 1 or the computer terminal of FIG. 9) that is configured to determine the address type of the router. From 1002, method 1000 proceeds to 1004.

At 1004, network interaction indicating a connection(s) between the router and one or more user devices, is received. A connection between the router and a user device can be determined based on an association between a MAC address of the user device and the router MAC address in the network interaction data. The network interaction data can be received by the computer terminal that is configured to determine the address type of the router. For example, the network interaction data can be collected by a module at the computer terminal or by a server (for example, the server in FIG. 9) and sent to the computer terminal over a network. From 1004, method 1000 proceeds to 1006.

At 1006, an access parameter number is determined. The access parameter number is determined based on the connections of the one or more devices to the router over a predetermined period of time. The connections of the one or more devices to the router are determined based on the network interaction data. For example, the access parameter number can be determined by one or more processors at the computer terminal that is configured to identify the address type of the router. The predetermined period of time can be a default value set on the computer terminal, or can be adjusted by an operator of the computer terminal or by a computer program that runs on the computer terminal.

The access parameter number can reflect the number of user devices connected to the router, a connection frequency of the one or more user devices connecting to the router, or a combination of both. In some examples, the access parameter number indicates a number of users (for example, a number of user devices) connecting to the router over the predetermined period of time. For example, repeated user MAC addresses in the network interaction data can be filtered out to leave for counting unique user MAC addresses for determining the number of users connecting to the router. In some examples, the access parameter number indicates a total number of connections of the one or more user devices to the router. For example, all the user MAC addresses (including repeated addresses) that are associated with the router MAC address in the network interaction data can be counted to determine the total number of connections. In some examples, the access parameter number indicates a number of successful connections of a specific user to the router. For example, user MAC addresses of one or more user devices of the specific user can be determined, and the network interaction data can be filtered based on the user MAC addresses to determine a number of times that the specific user has connected to the router. In some examples, the network interaction data indicates all attempts (including successful and unsuccessful attempts) to connect to the router. In some examples, the network interaction data does not include the unsuccessful attempts to connect, rather, the user MAC addresses associated with the router MAC address indicate successful connections to the router. From 1006, method 1000 proceeds to 1008.

At 1008, a router address type is determined. The router address type is determined based on comparing the access parameter number and a predetermined threshold value. For example, one or more processors at the above-described computer terminal can identify the router address type based on the comparison between the access parameter number and the predetermined threshold value. The predetermined threshold value can be a default value set on the computer terminal, or can be adjusted by an operator of the computer terminal or by a computer program that runs on the computer terminal (for example, based on the location of the router).

In some implementations, the router address type (for example, router MAC address type) can be identified to of a residential type or a business type. In some examples, the router address has a residential type if the number of users connecting to the router (for example, based on the access parameter number) is less than the predetermined threshold. In some examples, the router address has a business type if the number of users connecting the router is greater than the predetermined threshold. In some examples, the router address has a business type if the total number of connections (for example, based on the access parameter number) is greater than the predetermined threshold. In some examples, the router address has a residential type if the number of successful connections of a specific user to the router (for example, based on the access parameter number) is greater than the predetermined threshold.

In some implementations, one or more sub-types can be determined for a router address type. For example, based on the number of connections to a residential router (for example, a router with a residential address type) the residential router can be determined to be a work-residential router (for example, a router that is mostly used for work purposes in a residential environment) or a living-residential router (for example, a router that is mostly used for living purposes in a residential environment). In some examples, a number of workday connections to the router over a set period of time and a number of non-workday connections to the router over the set period of time are obtained; a ratio of the number of workday connections and the number of non-workday connections is determined; and, based on a comparison between the ratio and a ratio threshold value, a sub-type corresponding to the router is identified. For example, when the router is a residential router, if the ratio is greater than the ratio threshold value, the router may be identified as a work-residential router (which may indicate that the router is being used for work purposes in a residential environment).

Implementations of the present disclosure are to solve technical problems in determining address types of routers (or user devices). Traditionally, an address type is determined as residential or business based on the information that a user has entered, for example, during user registration. However, such information can suffer from a lack of authenticity of the entered address, deficiencies in the entered data, low coverage for data entered into data fields, and difficulties in distinguishing entered addresses as either a residential or a business type.

Implementations of the present disclosure provide methods and apparatuses for identifying address types of routers (or user devices in communication with the routers) based on the router MAC addresses. Accordingly, a router address is determined to be of a residential or a business type based on a MAC address of the router, and the MAC addresses of the user devices in communication with the router. Since the address types in the present implementations are determined based on communications between the router and the user devices over a network, the described problems with conventional methods can be mitigated or eliminated.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, for identifying a router address type of a router, the computer-implemented method comprising:

receiving, by one or more processors, a router media access control (MAC) address for the router;

receiving, by the one or more processors, network interaction data that indicates a connection between a user device and the router through an association between a user MAC address of the user device and the router MAC address;

determining, by the one or more processors, an access parameter number based on one or more connections of one or more user devices to the router over a predetermined period of time, the one or more connections being determined based on the network interaction data; and identifying, by the one or more processors, the router address type based on a comparison between the access parameter number and a predetermined threshold, the access parameter number indicates at least one of a number of users connecting to the router, a total number of connections of the one or more user devices to the router, and a number of successful connections of a specific user to the router, wherein the identifying the router address type comprises:
determining that the number of users connecting to the router is less than the predetermined threshold, and in response, identifying the address type as a residential router; and
determining that the number of users connecting to the router is greater than the predetermined threshold, and in response, identifying the router address type as a business router.

2. The computer-implemented method of claim 1, wherein the access parameter number reflects at least one of a number of user devices connecting to the router, and a connection frequency of the one or more user devices connecting to the router.

3. The computer-implemented method of claim 1, wherein the predetermined period of time is a first period of time, wherein, in response to determining the router address type is the residential router, the computer-implemented method further comprises:

obtaining a number of workday connections to the router and a number of non-workday connections to the router over a second period of time;

determining a ratio of the number of workday connections and the number of non-workday connections; and identifying, based on a comparison between the ratio and a ratio threshold value, a residential type corresponding to the residential router.

4. The computer-implemented method of claim 1, wherein the identifying the router address type comprises determining the total number of connections is greater than the predetermined threshold, and, in response, identifying the router address type as a business router.

5. The computer-implemented method of claim 1, wherein identifying the router address type further comprises determining the number of successful connections of the specific user to the router is greater than the predetermined threshold, and, in response, identifying the router address type as a residential router.

6. A non-transitory, computer-readable medium storing one or more instructions in a memory, executable by a processor in a computer system to perform operations comprising:

receiving a router media access control (MAC) address for a router;

receiving network interaction data that indicates a connection between a user device and the router through an association between a user MAC address of the user device and the router MAC address;

determining an access parameter number based on one or more connections of one or more user devices to the router over a predetermined period of time, the one or more connections being determined based on the network interaction data; and identifying the router address type based on a comparison between the access parameter number and a predetermined threshold, the access parameter number indicates at least one of a number of users connecting to the router, a total number of connections of the one or more user devices to the router, and a number of successful connections of a specific user to the router, wherein the identifying the router address type comprises:

determining that the number of users connecting to the router is less than the predetermined threshold, and in response, identifying the address type as a residential router; and determining that the number of users connecting to the router is greater than the predetermined threshold, and in response, identifying the router address type as a business router.

7. The non-transitory, computer-readable medium of claim 6, wherein the access parameter number reflects at least one of a number of user devices connecting to the router, and a connection frequency of the one or more user devices connecting to the router.

8. The non-transitory, computer-readable medium of claim 6, wherein the predetermined period of time is a first period of time, wherein, in response to determining the router address type is the residential router, the computer-readable medium further comprises one or more instructions executable to perform:

obtaining a number of workday connections to the router and a number of non-workday connections to the router over a second period of time;

determining a ratio of the number of workday connections and the number of non-workday connections; and identifying, based on a comparison between the ratio and a ratio threshold value, a residential type corresponding to the residential router.

9. The non-transitory, computer-readable medium of claim 6, wherein the identifying the router address type comprises determining the total number of connections is greater than the predetermined threshold, and, in response, identifying the router address type as a business router.

10. The non-transitory, computer-readable medium of claim 6, wherein identifying the router address type further comprises determining the number of successful connections of the specific user to the router is greater than the predetermined threshold, and, in response, identifying the router address type as a residential router.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a router media access control (MAC) address for the router;

receiving network interaction data that indicates a connection between a user device and the router through an association between a user MAC address of the user device and the router MAC address;

determining an access parameter number based on one or more connections of one or more user devices to the router over a predetermined period of time, the one or more connections being determined based on the network interaction data; and identifying the router address type based on a comparison between the access parameter number and a predetermined threshold, the access parameter number indicates at least one of a number of users connecting to the router, a total number of connections of the one or more user devices to the router, and a number of successful connections of a specific user to the router, wherein the identifying the router address type comprises:

determining that the number of users connecting to the router is less than the predetermined threshold, and in response, identifying the address type as a residential router; and determining that the number of users connecting to the router is greater than the predetermined threshold, and in response, identifying the router address type as a business router.

12. The computer-implemented system of claim 11, wherein the access parameter number reflects at least one of a number of user devices connecting to the router, and a connection frequency of the one or more user devices connecting to the router.

13. The computer-implemented system of claim 11, wherein the predetermined period of time is a first period of time, wherein, in response to determining the router address type is the residential router, the system is further configured to perform:

obtaining a number of workday connections to the router and a number of non-workday connections to the router over a second period of time;

determining a ratio of the number of workday connections and the number of non-workday connections; and identifying, based on a comparison between the ratio and a ratio threshold value, a residential type corresponding to the residential router.

14. The computer-implemented system of claim 11, wherein the identifying the router address type comprises determining the total number of connections is greater than the predetermined threshold, and, in response, identifying the router address type as a business router.

* * * * *